United States Patent
Hsu et al.

(10) Patent No.: US 9,612,515 B2
(45) Date of Patent: Apr. 4, 2017

(54) PROJECTION APPARATUS AND PROJECTION LENS THEREOF CAPABLE OF REDUCING FOCAL LENGTH AND ABERRATION

(75) Inventors: Ya-Ling Hsu, Hsinchu (TW); Ching-Lun Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 692 days.

(21) Appl. No.: 13/337,168

(22) Filed: Dec. 26, 2011

(65) Prior Publication Data

US 2013/0162957 A1  Jun. 27, 2013

(51) Int. Cl.
  *G03B 21/28* (2006.01)
  *G02B 13/16* (2006.01)
  *G02B 13/18* (2006.01)

(52) U.S. Cl.
  CPC ............ *G03B 21/28* (2013.01); *G02B 13/16* (2013.01); *G02B 13/18* (2013.01)

(58) Field of Classification Search
  CPC ......... G03B 21/28; G02B 13/16; G02B 13/18
  USPC ........................ 353/37, 78, 79, 98, 99, 101
  See application file for complete search history.

(56) References Cited

U.S. PATENT DOCUMENTS

| | | | |
|---|---|---|---|
| 6,631,994 B2 * | 10/2003 | Suzuki | G02B 5/09 348/E5.137 |
| 6,690,517 B2 | 2/2004 | Ohzawa et al. | |
| 6,984,044 B2 | 1/2006 | Kurioka et al. | |
| 6,989,936 B2 | 1/2006 | Hatakeyama | |
| 6,994,437 B2 * | 2/2006 | Suzuki | G02B 5/09 348/E5.137 |
| 6,994,442 B2 | 2/2006 | Kurematsu et al. | |
| 7,009,765 B2 | 3/2006 | Gohman | |
| 7,116,498 B2 * | 10/2006 | Nishikawa et al. | 359/749 |
| 7,370,977 B2 | 5/2008 | Lee | |
| 7,529,032 B2 * | 5/2009 | Takaura et al. | 359/649 |
| 7,549,755 B2 * | 6/2009 | Suzuki | G02B 13/0095 348/783 |
| 7,567,380 B2 | 7/2009 | Peterson et al. | |
| 7,677,738 B2 * | 3/2010 | Kuwata | G02B 13/16 353/77 |
| 7,701,639 B2 * | 4/2010 | Hisada | G02B 13/16 359/649 |
| 7,717,573 B2 | 5/2010 | Matsubara et al. | |

(Continued)

OTHER PUBLICATIONS

Fred A. Carson, Basic optics and optical instruments, pp. 4-31, 4-32, 1997.*

*Primary Examiner* — Bao-Luan Le
(74) *Attorney, Agent, or Firm* — Jianq Chyun IP Office (57) ABSTRACT

A projection lens including a reflective unit and a refractive unit is provided. The projection lens is disposed between an object side and an image side. The reflective unit is disposed between the object side and the image side and has a negative refractive power. The refractive unit is disposed between the object side and the reflective unit and has a positive refractive power. The refractive unit includes a first lens group and a second lens group. The first lens group is disposed between the object side and the reflective unit and includes at least one cemented lens and an aperture stop. The at least one cemented lens is disposed between the object side and the aperture stop. The second lens group is disposed between the first lens group and the reflective unit and includes at least one aspheric lens. A projection apparatus including the projection lens is also provided.

39 Claims, 6 Drawing Sheets

(56) References Cited

U.S. PATENT DOCUMENTS

| | | | |
|---|---|---|---|
| 7,748,855 B2 | 7/2010 | Imaoka | |
| 7,766,488 B2 | 8/2010 | Hirata et al. | |
| 7,780,296 B2 * | 8/2010 | Hisada | G03B 21/28 353/101 |
| 7,857,462 B2 * | 12/2010 | Hisada | G03B 21/28 353/101 |
| 8,029,147 B2 * | 10/2011 | Suzuki | G02B 13/0095 353/98 |
| 8,054,541 B2 * | 11/2011 | Kang et al. | 359/364 |
| 8,089,706 B2 * | 1/2012 | Kang et al. | 359/727 |
| 8,107,163 B2 * | 1/2012 | Nishikawa | G02B 17/08 359/364 |
| 8,210,693 B2 * | 7/2012 | Nishikawa | G02B 17/08 353/122 |
| 8,292,438 B2 * | 10/2012 | Nishikawa | H04N 9/3105 353/101 |
| 8,992,025 B2 * | 3/2015 | Piehler | G02B 5/08 353/78 |
| 2005/0200974 A1 * | 9/2005 | Nishikawa et al. | 359/691 |
| 2006/0193036 A1 * | 8/2006 | Suzuki | G02B 13/0095 359/364 |
| 2007/0229779 A1 * | 10/2007 | Kuwata | G02B 13/16 353/99 |
| 2008/0100927 A1 * | 5/2008 | Hisada | G02B 13/16 359/717 |
| 2008/0158439 A1 * | 7/2008 | Nishikawa | G02B 17/08 348/744 |
| 2009/0059185 A1 * | 3/2009 | Hisada | G03B 21/28 353/98 |
| 2009/0116124 A1 * | 5/2009 | Minefuji | G02B 17/08 359/727 |
| 2009/0122279 A1 * | 5/2009 | Minefuji | G03B 21/28 353/99 |
| 2009/0141370 A1 * | 6/2009 | Takaura et al. | 359/734 |
| 2009/0323202 A1 * | 12/2009 | Chen | G02B 17/08 359/717 |
| 2010/0020293 A1 * | 1/2010 | Yamamoto | G02B 15/177 353/85 |
| 2010/0053570 A1 * | 3/2010 | Amano | G02B 13/16 353/85 |
| 2010/0103387 A1 * | 4/2010 | Piehler | G02B 5/08 353/78 |
| 2010/0128345 A1 * | 5/2010 | Suzuki | G02B 17/0856 359/364 |
| 2010/0232038 A1 * | 9/2010 | Kang et al. | 359/717 |
| 2010/0277703 A1 * | 11/2010 | Hisada | G03B 21/28 353/98 |
| 2010/0290010 A1 * | 11/2010 | Hirata | G02B 13/18 353/37 |
| 2011/0216289 A1 * | 9/2011 | Morikuni | G03B 21/28 353/70 |
| 2011/0299049 A1 * | 12/2011 | Yatsu | G02B 13/24 353/98 |

* cited by examiner

PROJECTION APPARATUS AND PROJECTION LENS THEREOF CAPABLE OF REDUCING FOCAL LENGTH AND ABERRATION

BACKGROUND OF THE INVENTION

Field of the Invention

The invention generally relates to an optical apparatus and an element thereof, and more particularly, to a projection apparatus and a projection lens thereof.

Description of Related Art

Usually, if a projector is used to project an image to a larger screen, a longer projection distance is required. Contrarily, if projector is used to project an image with a shorter projection distance, a specific wide-angle lens is required to shorten the distance between the projection screen and the projector.

In the design of a wide-angle lens, aberration is a difficult issue a designer needs to be confronted with. In order to reduce the focal length and the aberration, many optical devices should be disposed in the projector. U.S. Pat. No. 7,567,380 discloses a projection lens using spheric lenses and aspheric lenses to refract light beams. All of elements to transmit the light beams are lenses in this patent. On the other hand, a designer adopts a plurality of reflection minors to shorten the projection distance, as shown by U.S. Pat. No. 7,717,573. However, the increasing reflection mirrors would increase the production cost and assembly difficulty.

Furthermore, U.S. Pat. No. 8,054,541 discloses a projection lens adopting a plurality of refraction lens at the object side and one reflection mirror at the image side to project images onto a screen.

Moreover, US Pub. No. 20090116124 discloses a projection optical system 50 including a first refracting optical section 20 having a triple-cemented lens L3 and a reflecting optical section 30 having a curved mirror 31. However, many optical properties of the projection optical system 50 should be improved.

SUMMARY OF THE INVENTION

The invention is directed to a projection apparatus and a projection lens thereof capable of reducing the focal length and the aberration.

In order to achieve one or a part of or all of the above advantages or other advantages, an embodiment of the invention provides a projection apparatus. The projection apparatus includes a light source module, a projection lens, and a light valve module. The light source module provides an illumination beam. The light valve module converts the illumination beam into an image beam. The light valve module is disposed at an object side and between the light source module and the projection lens. The projection lens is disposed between the object side and an image side. The projection lens includes a reflective unit and a refractive unit. The reflective unit is disposed between the object side and the image side and has a negative refractive power. The refractive unit is disposed between the object side and the reflective unit and has a positive refractive power. The refractive unit includes a first lens group and a second lens group. The first lens group is disposed between the object side and the reflective unit and includes at least one cemented lens and an aperture stop. The at least one cemented lens is disposed between the object side and the aperture stop. The second lens group is disposed between the first lens group and the reflective unit and includes at least one aspheric lens.

Another embodiment of the invention provides a projection lens. The projection lens is disposed between an object side and an image side. The projection lens includes a reflective unit and a refractive unit. The reflective unit is disposed between the object side and the image side and has a negative refractive power. The refractive unit is disposed between the object side and the reflective unit and has a positive refractive power. The refractive unit includes a first lens group and a second lens group. The first lens group is disposed between the object side and the reflective unit and includes at least one cemented lens and an aperture stop. The at least one cemented lens is disposed between the object side and the aperture stop. The second lens group is disposed between the first lens group and the reflective unit and includes at least one aspheric lens.

In view of the above, the embodiment or the embodiments of the invention may have at least one of the following advantages or functions. In the embodiments of the invention, a reflective unit and a refractive unit are adopted in a projection lens. In the embodiments of the invention, the projection lens has a small F number, and the refractive unit may have at least one triple cemented lens to eliminate chromated spherical aberration and also improve longitudinal and transverse chromatic aberration. In addition, the reflective unit reduces focal length of the projection lens and provides the function of wide-angle for the projection lens.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
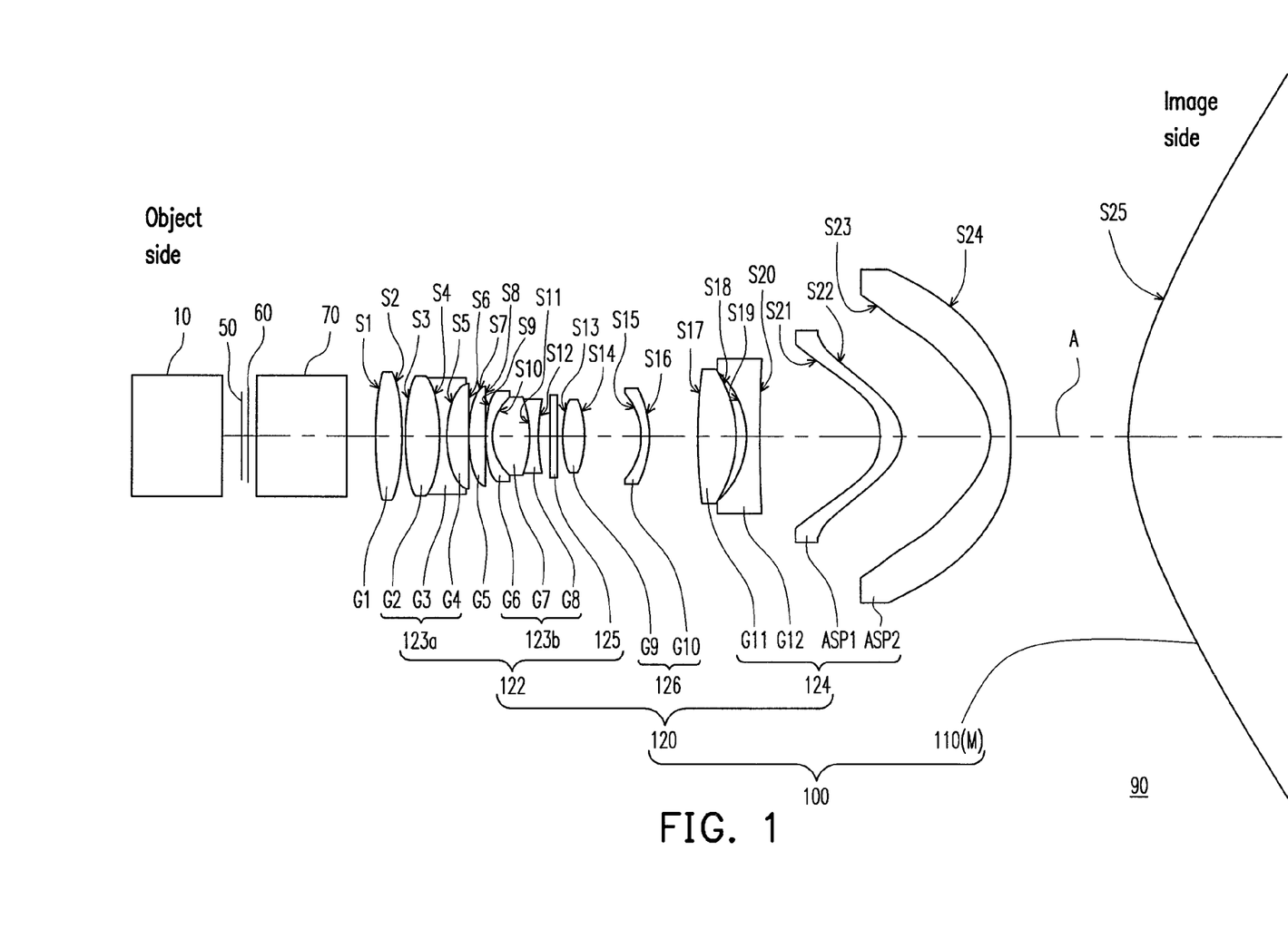
FIG. 1 is a schematic diagram of a projection apparatus according to an embodiment of the invention.

Referring to FIG. 1, in the embodiment, the projection apparatus 90 is used to project an image to a screen (not shown). The projection apparatus 90 of the embodiment includes a light source module 10, a projection lens 100, and a light valve module 50. The projection lens 100 is disposed between an object side and an image side, and the light valve module 50 is disposed at the object side and between the light source module 10 and the projection lens 100. The light source module 10 provides an illumination beam to the light valve module 50. The light valve module 50 converts the illumination beam into an image beam and outputs the image beam to the projection lens 100. The projection lens 100 projects a corresponding image to the screen. In the embodiment, the projection lens 100 has F number (F/#) 2 and serves as a wide-angle lens to shorten the distance between the screen and the projector apparatus 90. However, F number of the projection lens 100 is not limited to 2. In other embodiments, F number of the projection lens is smaller than or equal to 2, i.e. F/#≤2.

The projection lens 100 has an optical axis A and includes a reflective unit 110 and a refractive unit 120. The reflective unit 110 having a negative refractive power is disposed between the object side and the image side. In the embodiment, the reflective unit 110 includes a reflection mirror M, wherein the reflection mirror M has a negative refractive power and the reflection mirror M is, for example, a curved reflection mirror to compensate the distortion generated by the refractive unit 120. The curved reflection mirror M also reduces focal length of the projection lens 110 and achieves the function of wide-angle for the projection lens. The refractive unit 120 having a positive refractive power is disposed between the object side and the reflective unit 110 and includes a first lens group 122 and a second lens group 124.

In the embodiment, the reflective unit 110 does not cause dispersion, and the refractive unit 120 would reduce the dispersion by itself. Furthermore, a butterfly-like spot may be generated due to the refractive unit 120 after the image beam passes through the refractive unit 120, and the image beam forming the butterfly-like spot is compensated after being reflected by the reflective unit 110.

To be more specific, the first lens group 122 includes at least one cemented lens and an aperture stop 125, and the at least one cemented lens is disposed between the object side and the aperture stop 125. The first lens group 122 is disposed between the object side and the reflective unit 110. In the embodiment, the first lens group 122 includes eight lenses arranged from the object side towards the image side as a first lens G1, a second lens G2, a third lens G3, a fourth lens G4, a fifth lens G5, a sixth lens G6, a seventh lens G7, an eight lens G8, and the aperture stop 125. The first lens G1, the second lens G2, the third lens G3, the fourth lens G4, the fifth lens G5, the sixth lens G6, the seventh lens G7, and the eight lens G8 have sequentially positive, positive, negative, positive, positive, negative, positive, and negative refractive powers.

In the embodiment, each of the first lens G1, the second lens G2, and the seventh lens G7 is a biconvex lens. Each of the third lens G3 and the eighth lens G8 is a biconcave lens. Each of the fourth lens G4, the fifth lens G5, and the sixth lens G6 is a concave-convex lens with a convex surface facing the object side.

Besides, in the embodiment, the second lens G2, the third lens G3, and the fourth lens G4 together form a first triple cemented lens 123a having a positive refractive power. Furthermore, in the embodiment, the sixth lens G6, the seventh lens G7, and the eighth lens G8 together form a second triple cemented lens 123b having a positive refractive power. In the embodiment, because the projection lens 100 has a small F number, the at least one triple cemented lens (two triple cemented lenses 123a and 123a for example) are adapted to eliminate chromated spherical aberration and also configured to improve longitudinal and transverse chromatic aberration.

In the embodiment, the refractive unit 120 further includes a third lens group 126. The third lens group 126 is disposed between the first lens group 122 and the second lens group 124. The third lens group 126 includes two lenses arranged from the object side towards the image side as a ninth lens G9 and a tenth lens G10. The ninth lens G9 and the tenth lens G10 have sequentially positive and negative refractive powers. In the embodiment, the ninth lens G9 is a biconvex lens, and the tenth lens G10 is a convex-concave lens with a convex surface facing the image side.

The second lens group 124 including at least one aspheric lens is disposed between the first lens group 122 and the reflective unit 110, and further includes two lenses arranged from the object side towards the image side as an eleventh lens G11 and a twelfth lens G12 in the embodiment. The eleventh lens G11 and the twelfth lens G12 have sequentially positive and negative refractive powers. In the embodiment, a first aspheric lens ASP1 disposed between the twelfth lens G12 and the reflective unit 120 would be designed in the second lens group 124. In other embodiment, a second aspheric lens ASP2 disposed between the twelfth lens G12 and the reflective unit 120 would be further designed in the second lens group 124, and each of the first aspheric lens ASP1 and the second aspheric lens ASP2 would be an axially symmetric aspheric lens and effectively improve monochromatic aberrations such as coma, astigmatism, and distortion.

In the embodiment, the eleventh lens G11 a biconvex lens, and the twelfth G12 lens is a biconcave lens, and each of the first aspheric lens ASP1 and the second aspheric lens ASP2 is a convex-concave lens with a convex surface facing the image side.

In the embodiment, the first lens group 122 and the third lens group 126 may keep a fixed position in the projection lens 100, while the second lens group 124 is moveable and moves in relation to the first lens group 122 and the third lens group 126 for focusing. In other words, the positions of the first lens group 122, the third lens group 126, and the light valve module 50 keep fixed to remain the relative position between an image and an object to be projected in the embodiment. The second lens group 124 is a focusing lens group suitable to conduct a focus-adjusting compensation for different projection distances in the embodiment. In addition, when a product is going to be shipped out, a designer may appropriately adjust the first lens group 122 and the third lens group 126 so as to effectively compensate the manufacturing tolerance and further to reach the focusing effect and reduce the aberration of the frame. In this way, the user may reach the focusing effect by adjusting the second lens group 124. That is to say, when the imaging position needs to be changed, the user may complete the focusing operation by making a relative move between the lens groups. In the embodiment, the projection distance is, for example, 338 mm to 381 mm and the size of the projection screen is, for example, 87 inch to 97 inch. In addition, a projection ratio of the projection distance and a diagonal line of the screen is smaller than 0.2. Herein, the projection ratio of the projection lens 100 is between 0.153 and 0.155, for example.

In the embodiment, for the image beam the refractive unit 120, a distance between a paraxial ray focus of the image beam and the refractive unit 120 is shorter than a distance between an off-axis ray focus of the image beam and the refractive unit 120.

Figure 2:
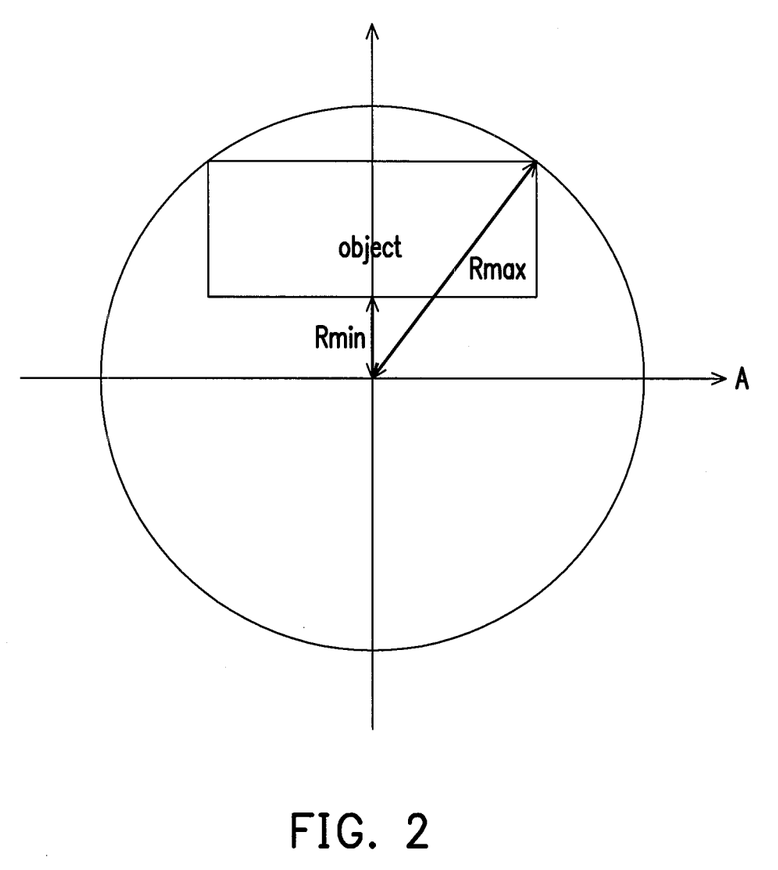
FIG. 2 shows a relationship of the projected object and the optical axis A.

On the other hand, the light valve module 50 may be an image processing device, e.g. liquid crystal on silicon (LCOS), digital micro-mirror device (DMD), or another suitable light valve, is disposed at the object side. In the embodiment, one cover glasses 60 may be further disposed between the first lens G1 and the light valve module 50 so as to protect the light valve module 50. The projection lens 100 is used to project an image of an object in the light valve module 50 onto a screen (not shown) in the embodiment. The object may be a specific element in the light valve module 50 or the light valve module 50 itself. Referring to FIG. 2, in the embodiment, a minimum distance between a projected object and the optical axis A is Rmin and a maximum distance between the projected object and the optical axis A is Rmax, and Rmin and Rmax satisfy the condition as follows: 0.1<Rmin/Rmax<0.5.

In following, an embodiment of the projection lens 120 is given. It should be noted that the data listed in the following Table 1 is not used to limit the invention; anyone skilled in the art may refer the disclosure and is allowed to modify the parameter or setting, which still falls in the scope of the invention.

TABLE 1

| Surface | Curvature radius (mm) | Thickness (mm) | Refractive index | Abbe number | Note |
|---------|----------------------|----------------|------------------|-------------|------|
| S1  | 96.09211  | 7.24      | 1.84666  | 23.7779 | G1 |
| S2  | −57.08738 | 0.8820518 |          |         |    |
| S3  | 48.64836  | 9.7       | 1.603112 | 60.6411 | G2 |
| S4  | −37.55945 | 2.26      | 1.834044 | 37.2956 | G3 |

TABLE 1-continued

| Surface | Curvature radius (mm) | Thickness (mm) | Refractive index | Abbe number | Note |
|---------|----------------------|----------------|------------------|-------------|------|
| S5   | 26.21725   | 6.13     | 1.48749  | 70.2363 | G4 |
| S6   | 451.5574   | 0.2      |          |         |    |
| S7   | 33.93677   | 4.34     | 1.497    | 81.6103 | G5 |
| S8   | 342.2145   | 0.2      |          |         |    |
| S9   | 28.64001   | 2.2      | 1.850249 | 32.1701 | G6 |
| S10  | 15.26828   | 10.6     | 1.48749  | 70.2363 | G7 |
| S11  | −25.86209  | 2.2      | 1.834044 | 37.2956 | G8 |
| S12  | 66.17618   | 4.510246 |          |         |    |
| STOP | ∞          | 2.810709 |          |         | 125 |
| S13  | 38.46835   | 5.72     | 1.517417 | 52.4309 | G9 |
| S14  | −30.6446   | 16.10209 |          |         |    |
| S15  | −19.61485  | 2.2      | 1.497    | 81.6103 | G10 |
| S16  | −30.81011  | 15.18138 |          |         |    |
| S17  | 453.1946   | 10.01    | 1.6668   | 33.055  | G11 |
| S18  | −33.70976  | 2.943991 |          |         |    |
| S19  | −26.01573  | 3.42     | 1.497    | 81.6103 | G12 |
| S20  | 200.6503   | 34.50412 |          |         |    |
| S21  | −11.43961  | 5.86     | 1.525279 | 55.9508 | ASP1 |
| S22  | −10.20188  | 25.45617 |          |         |    |
| S23  | −10.91849  | 5.74     | 1.525279 | 55.9508 | ASP2 |
| S24  | −66.6947   | 32.2     |          |         |    |
| S25  | 41.19219   | 0        |          |         | 110(M) |

In Table 1, the thickness means the straight distance between two adjacent surfaces along the optical axis A. For example, the thickness of the surface S1 is the straight distance between the surface S1 and the surface S2 along the optical axis A. The lenses in the column Note have the corresponding thickness, refractive indexes, and Abbe numbers referring to the corresponding row, wherein the thickness are respectively the thicknesses of the lenses.

In Table 1, the surfaces S1 and S2 are two surfaces of the first lens G1; the surfaces S3 and S4 are two surfaces of the second lens G2; the surfaces S4 and S5 are two surfaces of the third lens G3; the surfaces S5 and S6 are two surfaces of the fourth lens G4. The surfaces S7 and S8 are two surfaces of the fifth lens G5; the surfaces S9 and S10 are two surfaces of the sixth lens G6; the surfaces S10 and S11 are two surfaces of the seventh lens G7; the surfaces S11 and S12 are two surfaces of the eighth lens G8.

In the embodiment, the second lens G2, the third lens G3, and the fourth lens G4 together form the first triple cemented lens 123a. The surface S4 is a surface of the second lens G2 to join the third lens G3, and the surface S5 is a surface of the third lens G3 to join the fourth lens G4. The refractive index of the third lens G3 is higher than refractive indexes of the second lens G2 and the fourth lens G4. The third lens G3 has Abbe number between 20 and 40 substantially, and each of the second lens G2 and the fourth lens G4 has Abbe number between 55 and 90 substantially.

Besides, the sixth lens G6, the seventh lens G7, and the eighth lens G8 together form a second triple cemented lens 123b. The surface S10 is a surface of the sixth lens G6 to join the seventh lens G7, and the surface S11 is a surface of the seventh lens G7 to join the eighth lens G8. The refractive index of the seventh lens G7 is lower than refractive indexes of the sixth lens G6 and the eighth lens G8. Each of the sixth lens G6 and the eighth lens G8 has Abbe number between 20 and 40, and the seventh lens G7 has Abbe number between 55 and 90.

The surfaces S13 and S14 are two surfaces of the ninth lens G9; the surfaces S15 and S16 are two surfaces of the tenth lens G10. The surfaces S17 and S18 are two surfaces of the eleventh lens G11; the surfaces S19 and S20 are two surfaces of the twelfth lens G12; the surfaces S21 and S22 are two surfaces of the first aspheric lens ASP1; and the surfaces S23 and S24 are two surfaces of the second aspheric lens ASP2. The surface S25 is a surface of the reflection mirror M facing the object side and is a reflective surface of the reflection minor M. The curvature radiuses and thicknesses may refer to Table 1, which is omitted to describe.

The surface S25 of the reflection minor M, the surfaces S21 and S22 of the first aspheric lens ASP1, and the surfaces S23 and S24 of the second aspheric lens ASP2 are even-aspheric surfaces, which are expressed by:

$$Z = \frac{cy^2}{1+\sqrt{1-(1+K)c^2y^2}} + A_1y^4 + A_2y^6 + A_3y^8 + A_4y^{10} + A_5y^{12} + A_6y^{14}$$

wherein Z is the sag along the optical axis direction, c is the reciprocal of the radius of the osculating sphere, i.e., the reciprocal of the curvature radius approaching the optical axis A (the curvature radiuses of the surfaces S21, S22, S23, S24, and S25 in Table 1), K is quadratic conic-surface coefficient, y is aspheric height, and $A_1$, $A_2$, $A_3$, $A_4$, $A_5$, $A_6$ are aspheric coefficients. Table 2 gives the parameters of the surfaces S21, S22, S23, S24, and S25.

TABLE 2

| Aspheric parameter | Quadratic conic-surface coefficient K | Coefficient $A_1$ | Coefficient $A_2$ | Coefficient $A_3$ | Coefficient $A_4$ | Coefficient $A_5$ | Coefficient $A_6$ |
|---|---|---|---|---|---|---|---|
| S21 | −0.9557899 | 3.700938E−06 | 1.457857E−08 | −5.576079E−13 | −3.237477E−14 | 1.494139E−16 | −1.277339E−19 |
| S22 | −1.000003 | 1.510933E−05 | 6.527421E−09 | 1.745078E−11 | −5.865047E−15 | −1.329628E−17 | 4.732803E−21 |
| S23 | −3.024055 | −1.069443E−05 | 5.757707E−09 | −8.437313E−12 | 7.923606E−15 | −2.572874E−18 | 2.080250E−22 |
| S24 | −1.390225 | −6.779562E−06 | 3.805037E−09 | −2.888608E−12 | 1.304094E−15 | −2.528059E−19 | 8.491363E−24 |
| S25 | −4.10541 | −8.257339E−08 | 7.086790E−12 | −3.624534E−16 | 9.932639E−21 | −1.103588E−25 | |

It may be seen that in the embodiment the embodiment the reflection mirror M, the first aspheric lens ASP1, and the second aspheric lens ASP2 are aspheric lenses, so that the coma, the astigmatism or the distortion of the projection apparatus 90 are effectively reduced. In the embodiment, the effective focal length of the projection apparatus 90 is between 2.59 mm and the numerical aperture F# is 2, which the invention is not limited to. In addition, the effective focal length (EFL) of the first lens group 122 combined with the third lens group 126 is, for example, 34.1 mm; the effective focal length (EFL) of the second lens group 124 is, for example, −77.1 mm; and the effective focal length (EFL) of the reflection minor M is, for example, −20.59 mm.

Figure 3A:
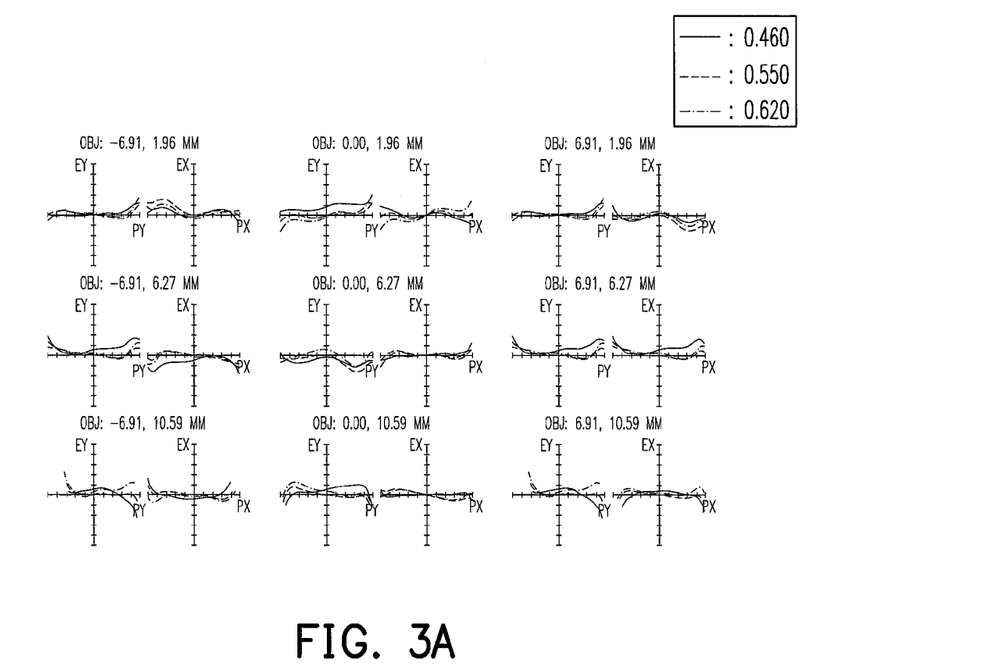
FIGS. 3A-3D are imaging optical simulation data plots of the projection apparatus of FIG. 1 applied to a projection screen having the size of 87 inch.
Figure 3B:
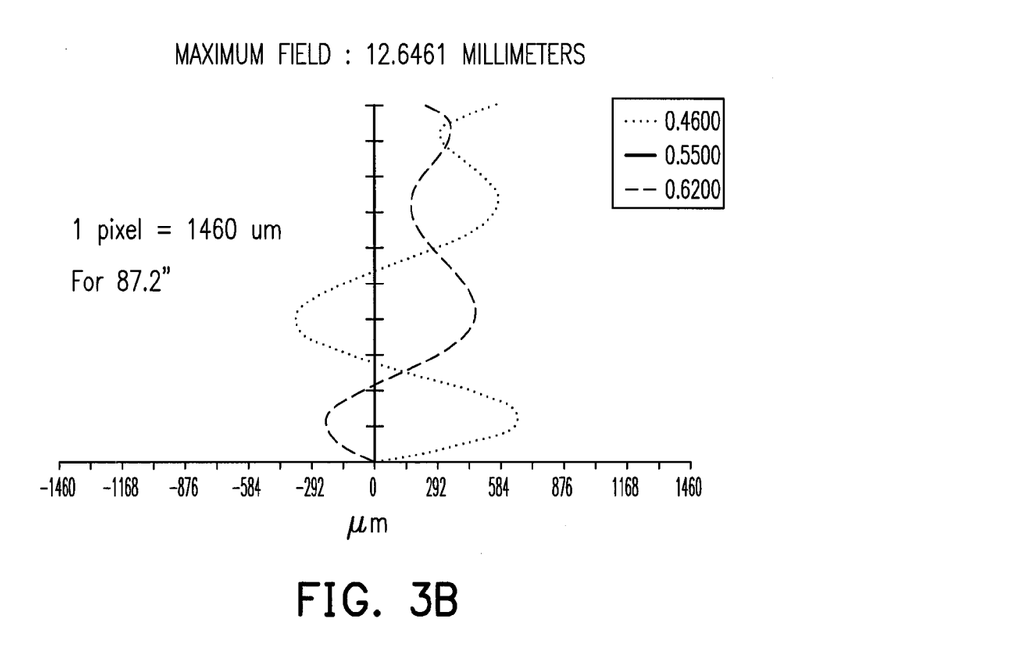
Figure 3C:
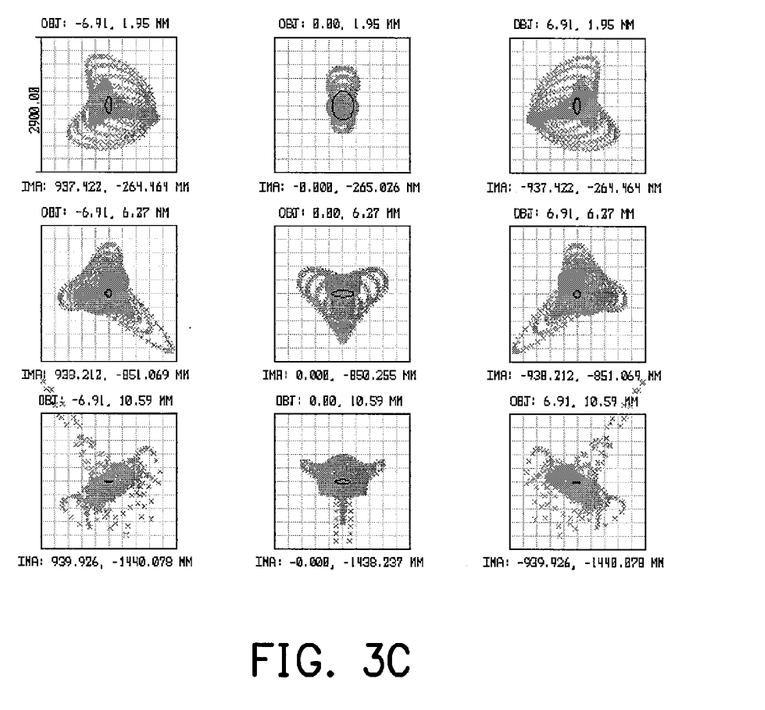
Figure 3D:
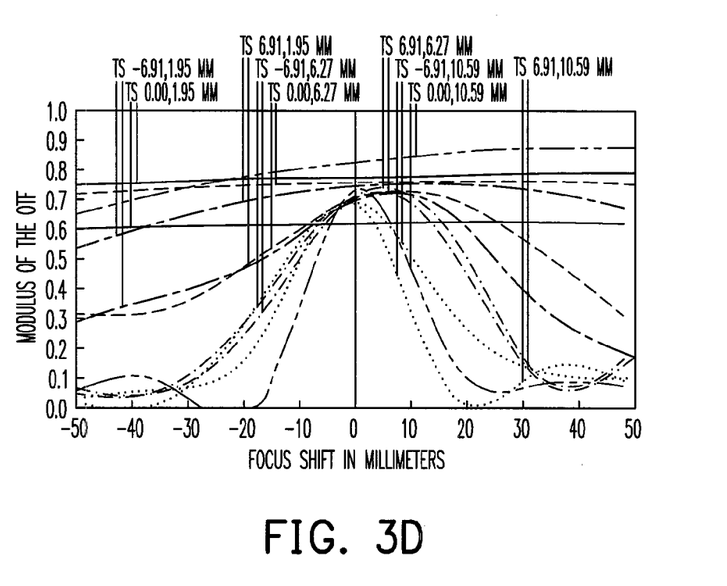

Referring to FIGS. 3A-3D. The simulation is conducted on three reference waveband of a red light (wavelength 620 nm), a green light (wavelength 550 nm), and a blue light (wavelength 460 nm). FIG. 3A herein is a transverse ray fan plot, wherein x axis represents the position where the light passes through the aperture stop 125 and y axis represents the position where the light strikes onto the image plane (for example, the light valve module 50). FIG. 3B is a lateral color diagram, wherein the abscissa represents the distance between the intersecting point on the imaging plane by the primary lights of three wavelengths and the intersecting point on the imaging plane by the primary light of the central wavelength; the ordinate represents field radius. FIG. 3C is a spot diagram showing the different light spot sizes when different points are projected onto the projection screen (not shown). FIG. 3D is a modulation transfer function (MTF) graph, and in the MTF graph, the transverse axis indicates a spatial frequency in cycles per millimeter, and the longitudinal axis indicates a modulus of the optical transfer function (OTF). The figures given by FIGS. 3A-3D are within the range of the standard, which means the projection apparatus 90 of the embodiment has a better imaging quality.

Figure 4A:
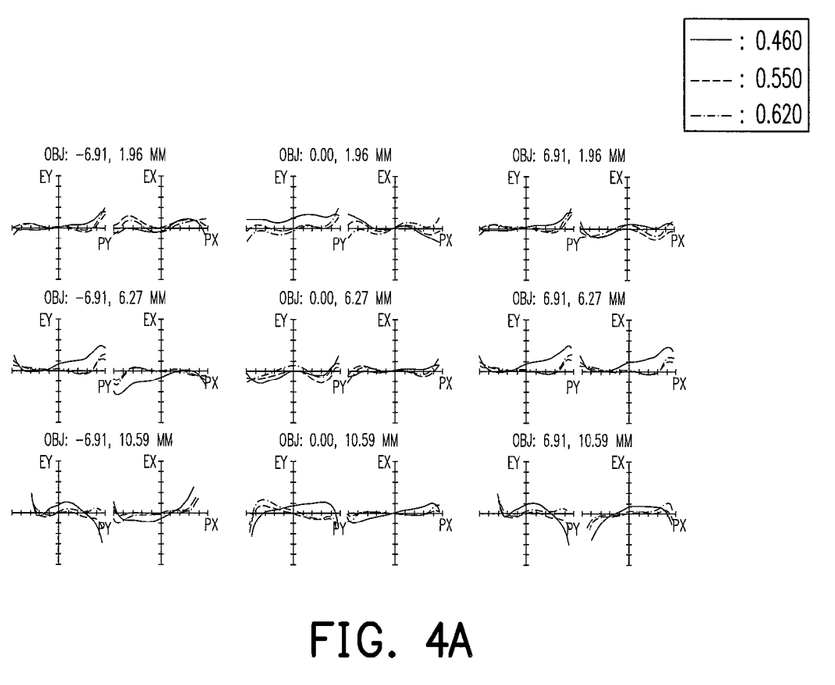
FIGS. 4A-4D are imaging optical simulation data plots of the projection apparatus of FIG. 1 applied to a projection screen having the size of 97 inch.
Figure 4B:
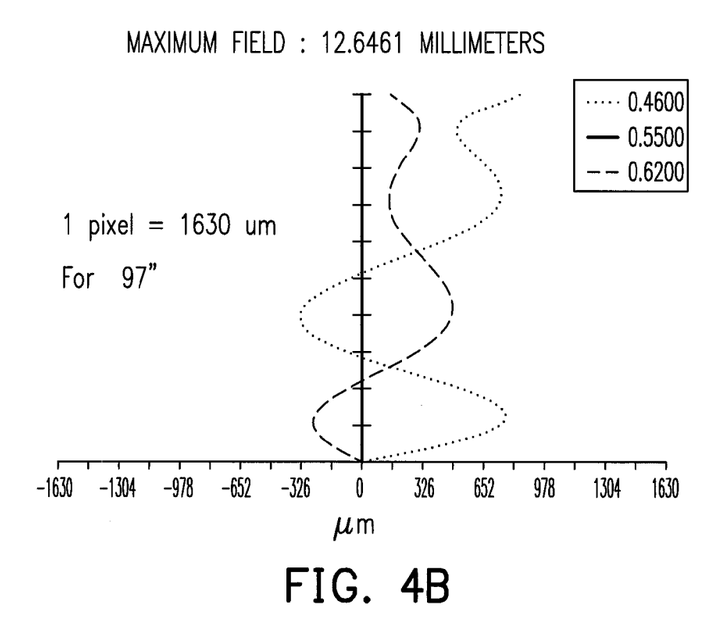
Figure 4C:
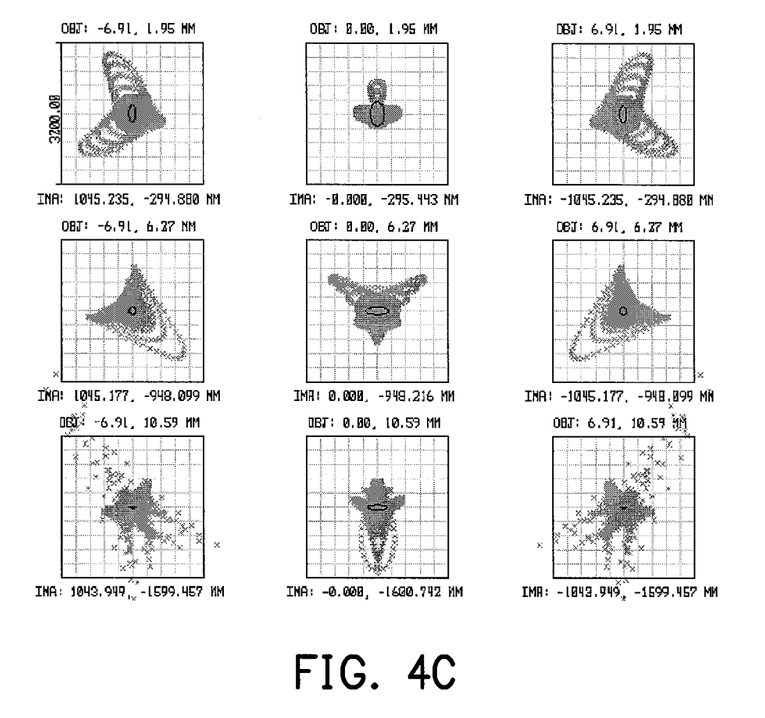
Figure 4D:
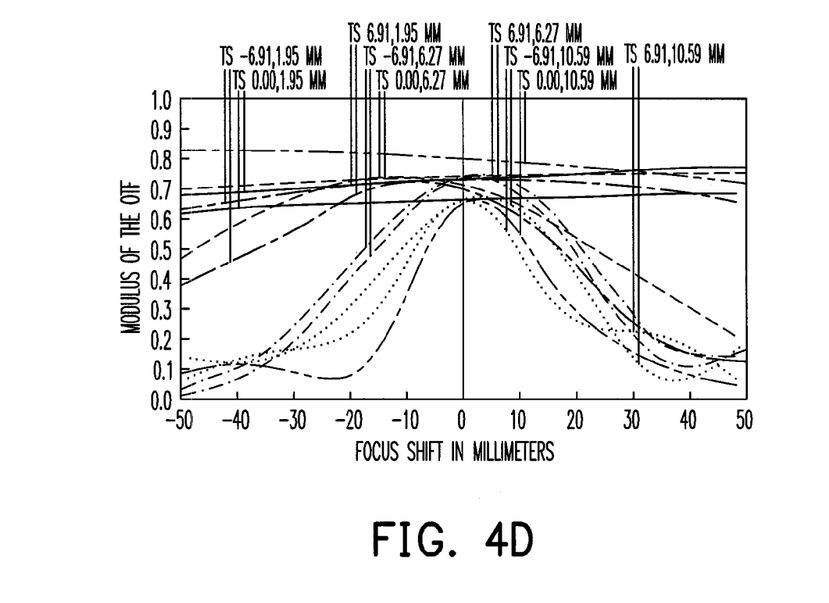

Furthermore, the projection apparatus 90 of FIG. 1 may also be applied to another projection screen with different size. Referring to FIGS. 4A-4D. The simulation is conducted on three reference waveband of a red light (wavelength 620 nm), a green light (wavelength 550 nm), and a blue light (wavelength 460 nm). FIG. 4A herein is a transverse ray fan plot, wherein x axis represents the position where the light passes through the aperture stop 125 and y axis represents the position where the light strikes onto the image plane (for example, the light valve module 50). FIG. 4B is a lateral color diagram, wherein the abscissa represents the distance between the intersecting point on the imaging plane by the primary lights of three wavelengths and the intersecting point on the imaging plane by the primary light of the central wavelength; the ordinate represents field radius. FIG. 4C is a spot diagram showing the different light spot sizes when different points are projected onto the projection screen (not shown). FIG. 4D is a modulation transfer function (MTF) graph, and in the MTF graph, the transverse axis indicates a spatial frequency in cycles per millimeter, and the longitudinal axis indicates a modulus of the optical transfer function (OTF). The figures given by FIGS. 4A-4D are within the range of the standard, which means the projection apparatus 90 of the embodiment has a better imaging quality.

In summary, the embodiment or the embodiments of the invention may have at least one of the following advantages. In the embodiments of the invention, a reflective unit and a refractive unit are adopted in the projection lens. In the embodiments of the invention, the projection lens has a small F number, and the reflective unit has two triple cemented lenses to eliminate chromated spherical aberration and also improve longitudinal and transverse chromatic aberration. In the embodiments of the invention, the first lens group and the third lens group are movable and move together with respect to the second lens group to compensate manufacturing tolerance, and the second lens group is movable and moves with respect to the first lens group and the third lens group to focus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A projection apparatus, comprising:
   a light source module, providing an illumination beam;
   a projection lens, disposed between an object side and an image side, and the projection lens comprising:
      a reflective unit, disposed between the object side and the image side and having a negative refractive power; and
      a refractive unit, disposed between the object side and the reflective unit and having a positive refractive power, and the refractive unit comprising:
         a first lens group, disposed between the object side and the reflective unit and comprising at least one cemented lens and an aperture stop, wherein the at least one cemented lens is disposed between the object side and the aperture stop, the first lens group further comprises a first lens, and the at least one cemented lens comprises a second lens, a third lens, and a fourth lens, wherein a refractive index of the third lens is higher than refractive indexes of the second lens and the fourth lens, the third lens has Abbe number between 55 and 90 substantially, and each of the second lens and the fourth lens has Abbe number between 20 and 40 substantially; and
         a second lens group, disposed between the first lens group and the reflective unit and comprising at least one aspheric lens; and
   a light valve module, converting the illumination beam into an image beam, disposed at the object side, and disposed between the light source module and the projection lens.

2. The projection apparatus as claimed in claim 1, wherein the refractive unit further comprises a third lens group disposed between the first lens group and the second lens group.

3. The projection apparatus as claimed in claim 2, wherein the third lens group comprises a ninth lens and a tenth lens arranged in sequence from the object side to the image side, and refractive powers of the ninth lens and the tenth lens are respectively positive and negative.

4. The projection apparatus as claimed in claim 3, wherein the ninth lens is a biconvex lens, and the tenth lens is a convex-concave lens with a convex surface facing the image side.

5. The projection apparatus as claimed in claim 2, wherein the second lens group is movable and moves with respect to the first lens group and the third lens group to focus.

6. The projection apparatus as claimed in claim 2, wherein the first lens group and the third lens group are movable and move together with respect to the second lens group to compensate manufacturing tolerance.

7. The projection apparatus as claimed in claim 1, wherein the at least one cemented lens is a first triple cemented lens having a positive refractive power formed with the second lens, the third lens, and the fourth lens, and refractive powers of the first lens, the second lens, the third lens, and the fourth lens are sequentially positive, positive, negative, and positive from the object side towards the image side.

8. The projection apparatus as claimed in claim 7, wherein the first lens group further comprises a fifth lens and a second triple cemented lens, the second triple cemented lens having a positive refractive power is formed with a sixth lens, a seventh lens, and an eighth lens, and refractive powers of the fifth lens, the sixth lens, the seventh lens, and the eighth lens are respectively positive, negative, positive, and negative.

9. The projection apparatus as claimed in claim 8, wherein a refractive index of the seventh lens is lower than refractive indexes of the sixth lens and the eighth lens, each of the sixth lens and the eighth lens has Abbe number between 55 and 90 substantially, and the seventh lens has Abbe number between 20 and 40 substantially.

10. The projection apparatus as claimed in claim 8, wherein each of the first lens, the second lens, and the seventh lens is a biconvex lens, each of the third lens and the eighth lens is a biconcave lens, and each of the fourth lens, the fifth lens, and the sixth lens is a concave-convex lens with a convex surface facing the object side.

11. The projection apparatus as claimed in claim 7, wherein Abbe numbers of two lenses of the first triple cemented lens at two opposite sides of the first triple cemented lens are greater than an Abbe number of a lens sandwiched therebetween.

12. The projection apparatus as claimed in claim 1, wherein the second lens group further comprises an eleventh lens and a twelfth lens arranged in sequence from the object side to the image side, and refractive powers of the eleventh lens and the twelfth lens are respectively positive and negative.

13. The projection apparatus as claimed in claim 12, wherein the quantity of the at least one aspheric lens disposed between the twelfth lens and the reflective unit is one.

14. The projection apparatus as claimed in claim 12, wherein the at least one aspheric lens has a first aspheric lens and a second aspheric lens arranged in sequence from the object side to the image side and disposed between the twelfth lens and the reflective unit.

15. The projection apparatus as claimed in claim 14, wherein each of the first aspheric lens and the second aspheric lens is a concave-convex lens with a convex surface facing the image side.

16. The projection apparatus as claimed in claim 12, wherein the eleventh lens is a biconvex lens, and the twelfth lens is a biconcave lens.

17. The projection apparatus as claimed in claim 1, wherein after the image beam passes through the refractive unit, a distance between a paraxial ray focus of the image beam and the refractive unit is shorter than a distance between an off-axis ray focus of the image beam and the refractive unit.

18. The projection apparatus as claimed in claim 1, wherein F number of the projection lens is smaller than or equal to 2.

19. The projection apparatus as claimed in claim 1, wherein the image beam is projected onto a screen, and a ratio of a projection distance and a diagonal line of the screen is smaller than 0.2.

20. The projection apparatus as claimed in claim 1, wherein a third lens sequentially counted from the object side towards the image side in the projection lens has a negative refractive power.

21. A projection lens, disposed between an object side and an image side, and comprising:
    a reflective unit, disposed between the object side and the image side and having a negative refractive power; and
    a refractive unit, disposed between the object side and the reflective unit and having a positive refractive power, and comprising:
        a first lens group, disposed between the object side and the reflective unit and comprising at least one cemented lens and an aperture stop, wherein the at least one cemented lens is disposed between the object side and the aperture stop, the first lens group further comprises a first lens, and the at least one cemented lens comprises a second lens, a third lens, and a fourth lens, wherein a refractive index of the third lens is higher than refractive indexes of the second lens and the fourth lens, the third lens has Abbe number between 55 and 90 substantially, and each of the second lens and the fourth lens has Abbe number between 20 and 40 substantially; and
        a second lens group, disposed between the first lens group and the reflective unit and comprising at least one aspheric lens.

22. The projection lens as claimed in claim 21, wherein the refractive unit further comprises a third lens group disposed between the first lens group and the second lens group.

23. The projection lens as claimed in claim 22, wherein the third lens group comprises a ninth lens and a tenth lens arranged in sequence from the object side to the image side, and refractive powers of the ninth lens and the tenth lens are respectively positive and negative.

24. The projection lens as claimed in claim 23, wherein the ninth lens is a biconvex lens, and the tenth lens is a convex-concave lens with a convex surface facing the image side.

25. The projection lens as claimed in claim 21, wherein the at least one cemented lens is a first triple cemented lens having a positive refractive power formed with the second lens, the third lens, and the fourth lens, and refractive powers of the first lens, the second lens, the third lens, and the fourth lens are sequentially positive, positive, negative, and positive from the object side towards the image side.

26. The projection lens as claimed in claim 25, wherein the first lens group further comprises a fifth lens and a second triple cemented lens, the second triple cemented lens having a positive refractive power is formed with a sixth lens, a seventh lens, and an eighth lens, and refractive powers of the fifth lens, the sixth lens, the seventh lens, and the eighth lens are respectively positive, negative, positive, and negative.

27. The projection lens as claimed in claim 26, wherein a refractive index of the seventh lens is lower than refractive indexes of the sixth lens and the eighth lens, each of the sixth lens and the eighth lens has Abbe number between 55 and 90 substantially, and the seventh lens has Abbe number between 20 and 40 substantially.

28. The projection lens as claimed in claim 26, wherein each of the first lens, the second lens, and the seventh lens is a biconvex lens, each of the third lens and the eighth lens is a biconcave lens, and each of the fourth lens, the fifth lens, and the sixth lens is a concave-convex lens with a convex surface facing the object side.

29. The projection lens as claimed in claim 21, wherein the second lens group further comprises an eleventh lens and a twelfth lens arranged in sequence from the object side to the image side, and refractive powers of the eleventh lens and the twelfth lens are respectively positive and negative.

30. The projection lens as claimed in claim 29, wherein the quantity of the at least one aspheric lens disposed between the twelfth lens and the reflective unit is one.

31. The projection lens as claimed in claim 29, wherein the at least one aspheric lens has a first aspheric lens and a second aspheric lens arranged in sequence from the object side to the image side and disposed between the twelfth lens and the reflective unit.

32. The projection apparatus as claimed in claim 31, wherein each of the first aspheric lens and the second aspheric lens is a concave-convex lens with a convex surface facing the image side.

33. The projection apparatus as claimed in claim 29, wherein the eleventh lens is a biconvex lens, and the twelfth lens is a biconcave lens.

34. The projection lens as claimed in claim 21, wherein after the image beam passes through the refractive unit, a distance between a paraxial ray focus of the image beam and the refractive unit is shorter than a distance between an off-axis ray focus of the image beam and the refractive unit.

35. The projection lens as claimed in claim 21, wherein F number of the projection lens is smaller than or equal to 2.

36. The projection lens as claimed in claim 21, wherein the image beam is projected onto a screen, and a ratio of a projection distance and a diagonal line of the screen is smaller than 0.2.

37. The projection lens as claimed in claim 21, wherein the projection lens has an optical axis, and a minimum distance between a projected object and the optical axis is Rmin, a maximum distance between the projected object and the optical axis is Rmax, and Rmin and Rmax satisfy a condition as follows: $0.1 < Rmin/Rmax < 0.5$.

38. The projection apparatus as claimed in claim 21, wherein the at least one cemented lens comprises a first triple cemented lens and a second triple cemented lens, the first triple cemented lens is formed with the second lens, the third lens, and the fourth lens, and the second triple cemented lens comprises three lenses having sequentially negative, positive and negative refractive powers from the object side towards the image side.

39. The projection apparatus as claimed in claim 21, wherein the at least one cemented lens comprises a first triple cemented lens and a second triple cemented lens, the first triple cemented lens is formed with the second lens, the third lens, and the fourth lens, and Abbe numbers of two lenses of the second triple cemented lens at two opposite sides of the second triple cemented lens are smaller than an Abbe number of a lens sandwiched therebetween.

* * * * *